(12) United States Patent
Lim et al.

(10) Patent No.: US 8,062,061 B2
(45) Date of Patent: Nov. 22, 2011

(54) MECHANISM OF FASTENING DETACHABLE ELECTRONIC DEVICE TO DIN RAIL

(75) Inventors: Choo Soo Lim, Amphur Muang (TH); Chaisri Phumchai, Amphur Muang (TH)

(73) Assignee: Delta Electronics (Thailand) Public Co., Ltd, Samutprakarn (TH)

( * ) Notice: Subject to any disclaimer, the term of this patent is extended or adjusted under 35 U.S.C. 154(b) by 881 days.

(21) Appl. No.: 11/929,125

(22) Filed: Oct. 30, 2007

(65) Prior Publication Data

US 2008/0108248 A1 May 8, 2008

(30) Foreign Application Priority Data

Nov. 3, 2006 (TW) ................................ 95140846 A

(51) Int. Cl.
*H01R 13/66* (2006.01)
(52) U.S. Cl. ........................................ 439/532; 439/716
(58) Field of Classification Search .......... 403/325–327; 211/26; 248/222.12; 439/532, 716
See application file for complete search history.

(56) References Cited

U.S. PATENT DOCUMENTS 5,904,592 A * 5/1999 Baran et al. ................... 439/532

* cited by examiner

*Primary Examiner* — Victor MacArthur
(74) *Attorney, Agent, or Firm* — Kirton & McConkie; Evan R. Witt

(57) ABSTRACT

A fastening mechanism for fastening a detachable electronic device onto a DIN rail includes a frame, a first slab member and a first resilient element. The frame includes a base, a first extension part and a second extension part. The first extension part and the second extension part are arranged at bilateral sides of the base. A first perforation is formed between the first extension part and the base. The first slab member is movable along the bottom surface of the first extension part and has an end penetrating through the first perforation to be disposed over the base. The first resilient element is coupled to the first slab member and exerts a clamping force for claming a first extending edge of the DIN rail between the first slab member and the base.

20 Claims, 23 Drawing Sheets

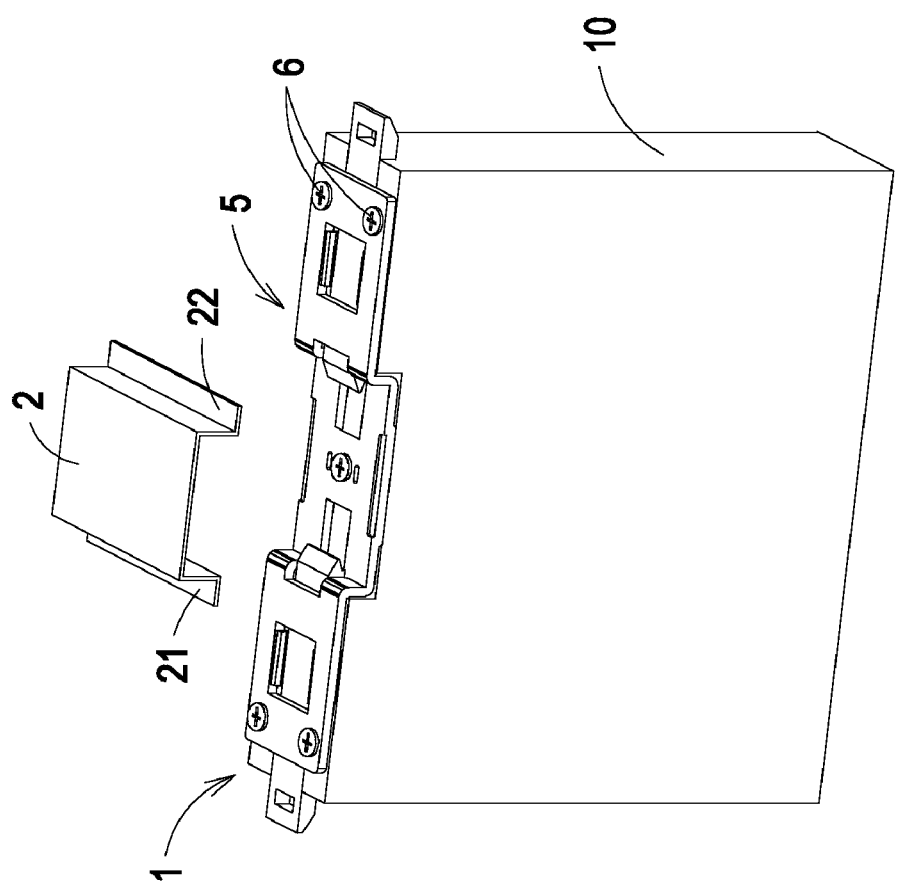

MECHANISM OF FASTENING DETACHABLE ELECTRONIC DEVICE TO DIN RAIL

FIELD OF THE INVENTION

The present invention relates to a fasting mechanism, and more particularly to a mechanism for fastening a detachable electronic device onto the DIN rail.

BACKGROUND OF THE INVENTION

Electronic device housings are frequently mounted to a DIN rail. For example, power supply apparatuses are usually detachably mounted to a DIN rail in a manner which resists unintentionally loosening the housing from the rail but permits easy removal for repair or replacement. In this regard, the housing of the electronic device has a mechanism for attaching the electronic device to the DIN rail.

Referring to FIG. 1(a), a schematic exploded view of a detachable electronic device and a DIN rail is illustrated. The housing 10 of the detachable electronic device 1 includes a fastening mechanism 11. The fastening mechanism 11 includes a bracket 111. The bracket 111 has a recess 112 for receiving the first extending edge 21 of the DIN rail 2. In response to an external force applying on the housing 10 as denoted by the dotted line, the second extending edge 22 of the DIN rail 2 is engaged with a connecting element 113 of the bracket 111. Via the fastening mechanism 11, the detachable electronic device 1 is mounted to the DIN rail 2.

FIG. 1(b) is a schematic assembled view of the detachable electronic device and the DIN rail. As previously described, since the external force is required to securely engage the second extending edge 22 of the DIN rail 2 with the connecting element 113, the DIN rail 2 is readily suffered from deformation due to the external force. Due to deformation, the DIN rail 2 may be damaged or even fail to be reusable. In addition, if the external force is improperly exerted, the DIN rail 2 possibly has a breakdown and thus the detachable electronic device 1 fails to be mounted to the DIN rail 2.

Although standardized DIN rails are typically used for mounting electrical components, different, non-standard rail types are becoming more widespread in use. Since the DIN rail 2 has various specifications, the width of every DIN rail 2 and the thickness of the first extending edge 21 or the second extending edge 22 are different according to different specifications. As a consequence, the detachable electronic device 1 should be mounted to a suitable DIN rail 2 having a specification complying with the fastening mechanism 11.

Since the detachable electronic device 1 is mounted to DIN rail 2 by receiving the first extending edge 21 into the recess 112 and engaging the second extending edge 22 with the connecting element 113, the DIN rail 2 needs to be horizontally arranged. In other words, the DIN rail 2 is not suitable to be vertically arranged because the detachable electronic device 1 is likely loosened or detached from the DIN rail 2 in a case of abrupt impact. Under this circumstance, the safety and the stability of the detachable electronic device 1 are impaired.

In views of the above-described disadvantages resulted from the conventional method, the applicant keeps on carving unflaggingly to develop a fastening mechanism according to the present invention through wholehearted experience and research.

SUMMARY OF THE INVENTION

It is an object of the present invention to provide a mechanism for fastening a detachable electronic device onto the DIN rail, so that the detachable electronic device may be horizontally or vertically mounted onto the DIN rail.

Another object of the present invention provides a fastening mechanism applicable to many DIN rail having different widths.

In accordance with a first aspect of the present invention, there is provided a fastening mechanism for fastening a detachable electronic device onto a DIN rail. The detachable electronic device has a main body. The DIN rail has a first extending edge and a second extending edge. The fastening mechanism includes a frame, a first slab member and a first resilient element. The frame includes a base, a first extension part and a second extension part. The first extension part and the second extension part are arranged at bilateral sides of the base. A first perforation is formed between the first extension part and the base. The first slab member is movable along the bottom surface of the first extension part and has an end penetrating through the first perforation to be disposed over the base. The first resilient element is coupled to the first slab member and exerts a clamping force for claming the first extending edge of the DIN rail between the first slab member and the base.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 7(a) is a schematic detachable electronic device to be mounted to a DIN rail according to a second preferred embodiment of the present invention;

FIG. 8(*b*) is a schematic cross-sectional view illustrating the fastening mechanism of FIG. 8(*a*) coupled with the DIN rail;

FIG. 10(*b*) is a schematic cross-sectional view illustrating the fastening mechanism of FIG. 10(*a*) coupled with the DIN rail;

DETAILED DESCRIPTION OF THE PREFERRED EMBODIMENT

Figure 1A:
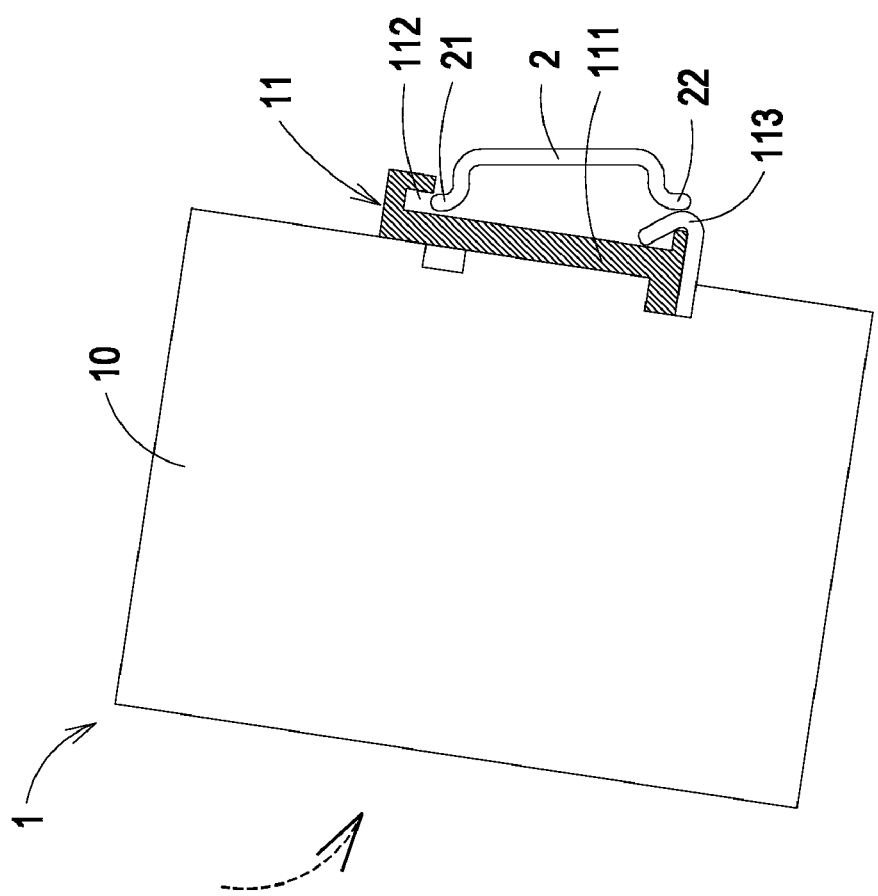
FIG. 1(a) is a schematic exploded view of a detachable electronic device and a DIN rail according to the prior art.
Figure 1B:
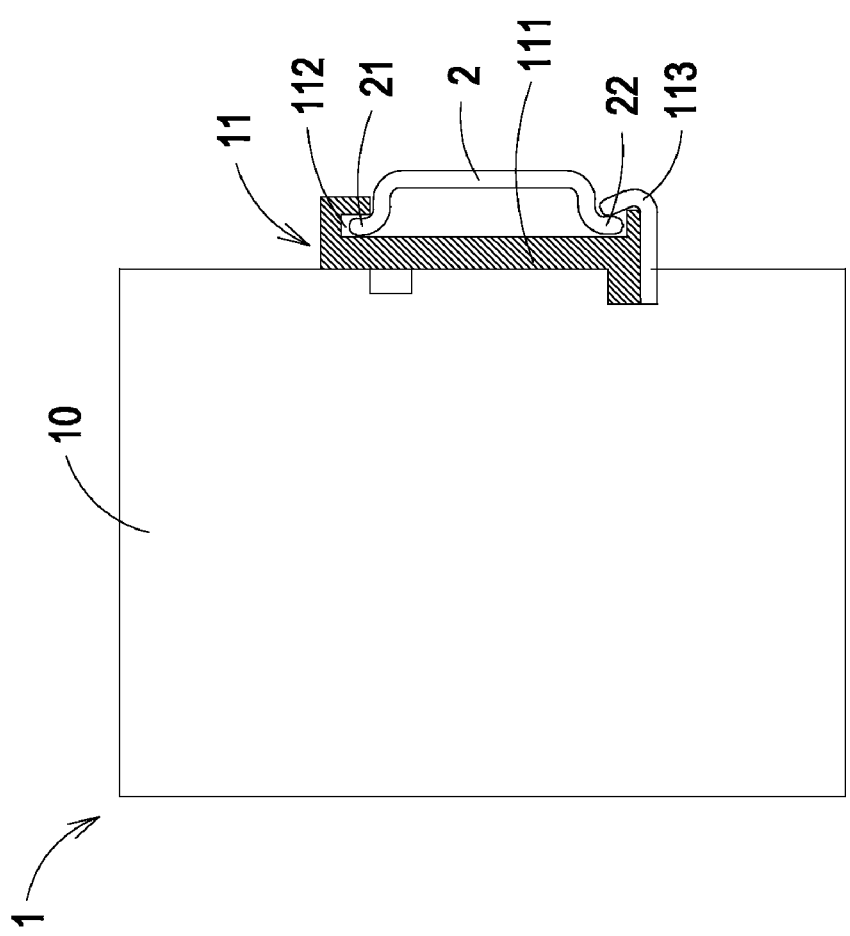
FIG. 1(b) is a schematic assembled view of the detachable electronic device and the DIN rail shown in FIG. 1(a)
Figure 2A:
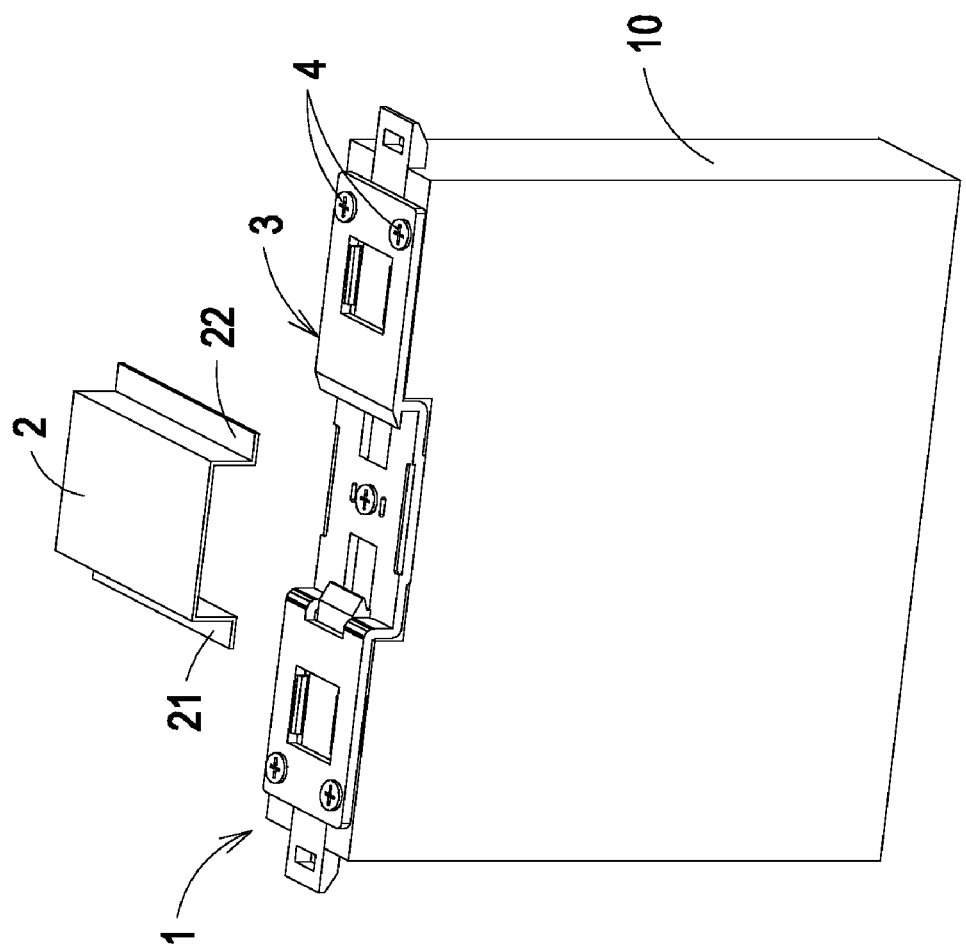
FIG. 2(a) is a schematic detachable electronic device to be mounted to a DIN rail according to a first preferred embodiment of the present invention.
Figure 2B:
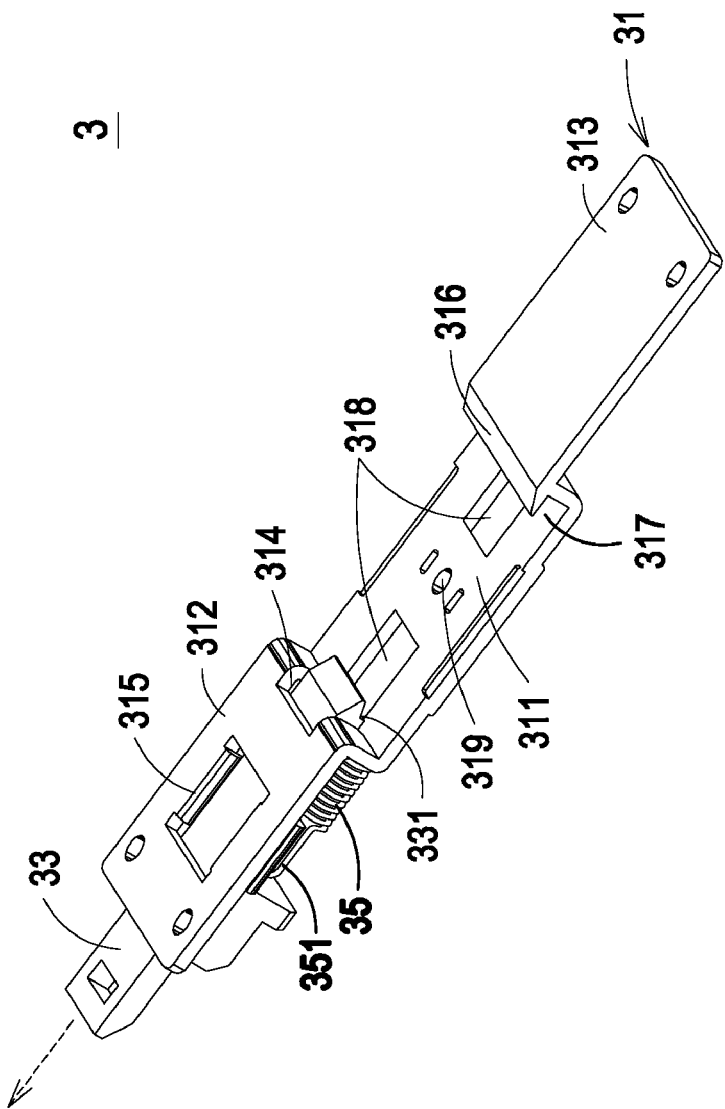
FIGS. 2(b) and 2(c) are schematic perspective view illustrating a first variant of the fastening mechanism according to the first preferred embodiment.
Figure 2C:
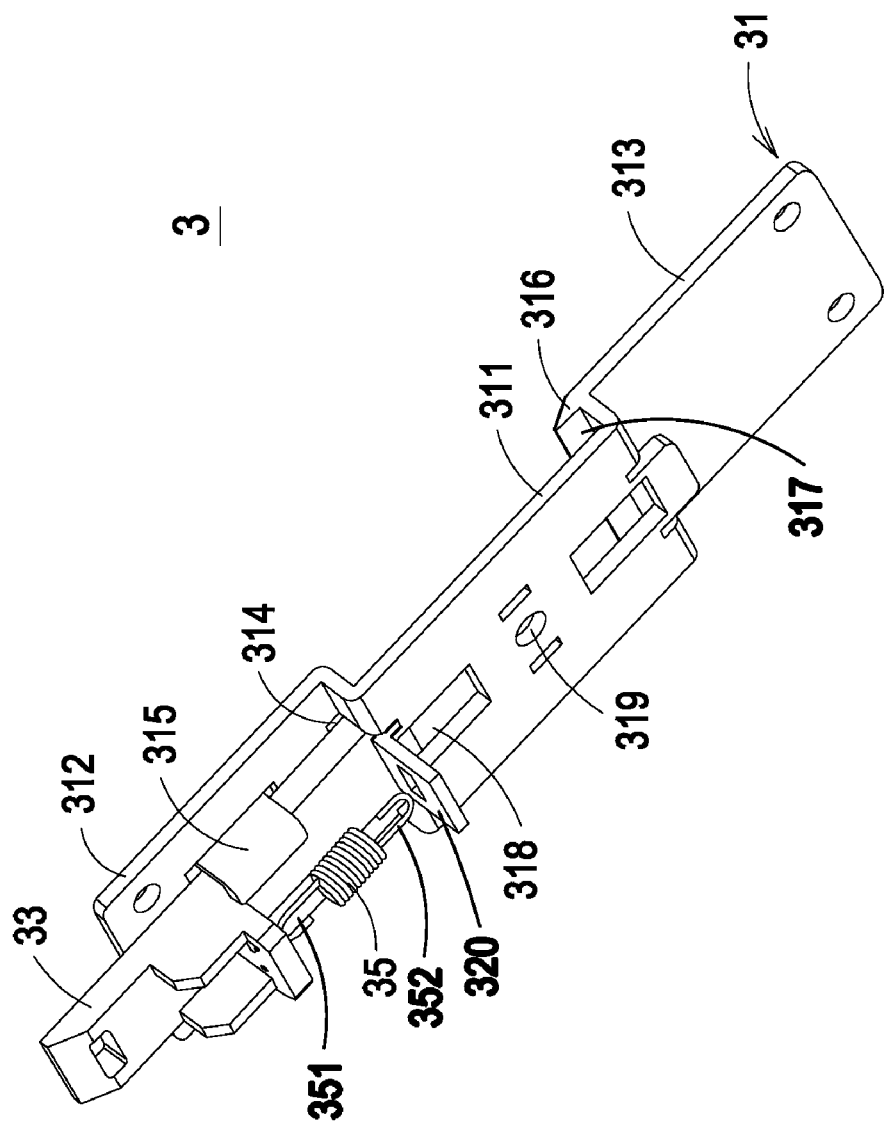
Figure 2D:
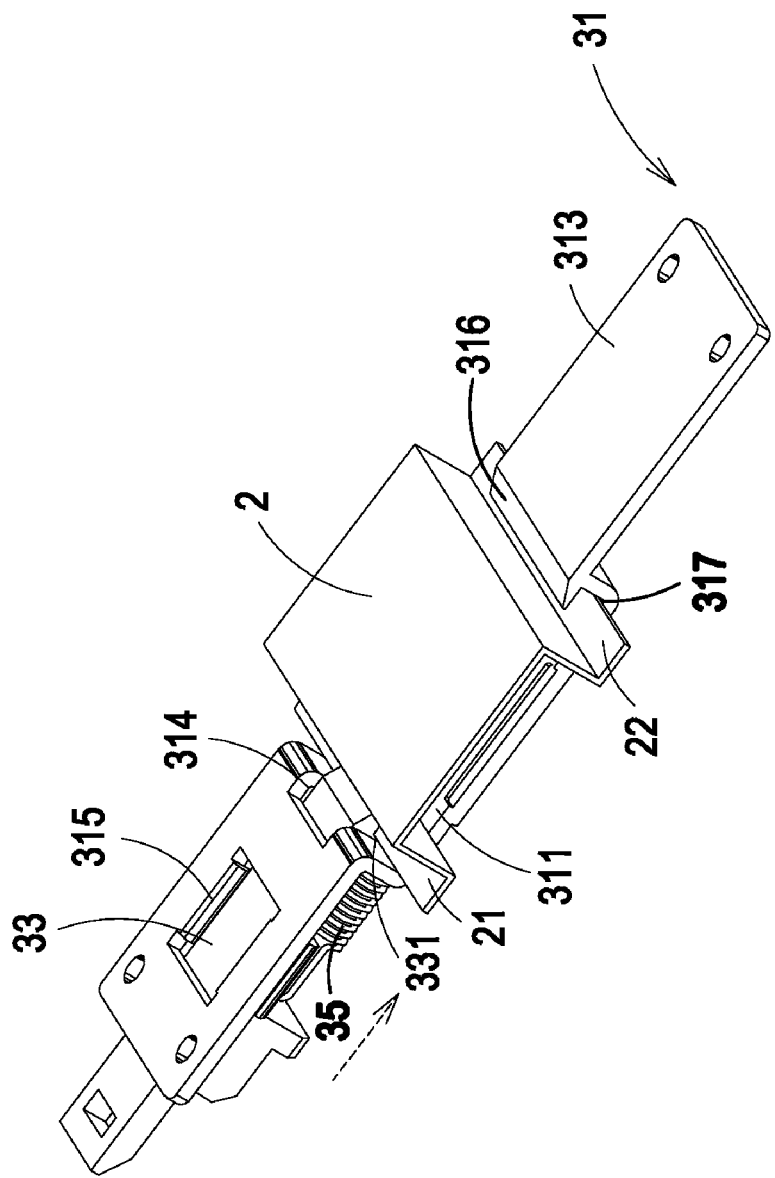
FIG. 2(d) is a schematic perspective view illustrating the fastening mechanism of FIG. 2(a) coupled with the DIN rail.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Referring to FIG. 2(*a*), a schematic detachable electronic device to be mounted to a DIN rail according to a first preferred embodiment of the present invention is illustrated. The detachable electronic device 1 includes a main body 10 and a fastening mechanism 3. The fastening mechanism 3 is fixed on the main body 10 via at least a screwing element 4. By engagement between the fastening mechanism 3 and the extending edges 21, 22 of the DIN rail 2, the main body 10 of the detachable electronic device 1 is mounted to the DIN rail 2.

Hereinafter, a first variant of the fastening mechanism 3 will be illustrated in more details with reference to FIGS. 2(*b*) and 2(*c*). The fastening mechanism 3 includes a frame 31, a first slab member 33 and a first resilient element 35. By partially cutting a metallic plate and bending the edge portions thereof, the frame 31 is integrally formed. In an embodiment, the frame 31 includes a base 311, a first extension part 312 and a second extension part 313. The first extension part 312 and the second extension part 313 are arranged at bilateral sides of the base 311 and higher than the base 311. A first perforation 314 is disposed between the first extension part 312 and the base 311. The first extension part 312 further includes a first bracket 315, which is protruded from the bottom surface of the of the first extension part 312. The first slab member 33 is supported by the first bracket 315 and has an end penetrating through the first perforation 314 to be disposed over the base 311. The connecting part between the second extension part 313 and the base 311 has a protrusion structure 316 over the base 311. A second recess 317 is defined between the protrusion structure 316 and the base 311 for receiving the second extending edge 22 of the DIN rail 2. The base 311 further includes at least a hollow portion 318 and a pivotal hole 319. The pivotal hole 319 is arranged at the center-of-gravity position of the base 311.

Please refer to FIGS. 2(*b*) and 2(*c*). The first slab member 33 is made of polymeric material such as Nylon. The first slab member 33 further comprises a first recess 331 at the end penetrating through the first perforation 314 for receiving the first extending edge 21 of the DIN rail 2. The first resilient element 35 is for example a spring having a first terminal 351 coupled to the first slab member 33 and a second terminal 352 coupled to either a first ear part 320 of the frame 31 or a second ear part (not shown) protruded from the main body 10. In response to stretch or compression of the first resilient element 35, the first slab member 33 is movable with respect to the frame 31.

FIG. 2(*d*) is a schematic perspective view illustrating that the fastening mechanism 3 is coupled with the DIN rail 2. Please refer to FIGS. 2(*b*), 2(*c*) and 2(*d*). For coupling the fastening mechanism 3 to the DIN rail 2, the second extending edge 22 of the DIN rail 2 is firstly received in the second recess 317 between the protrusion structure 316 and the base 311. Then, in response to a pulling force exerting on the first slab member 33 in the arrow direction shown in FIG. 2(*b*), the first resilient element 35 is stretched and the first slab member 33 is movable with respect to the base 311 of the frame 31. Meanwhile, the first slab member 33 is sunken under the first perforation 314. After the first extending edge 21 of the DIN rail 2 is placed on the base 311, the end of the first slab member 33 is penetrated through the first perforation 314 and the first extending edge 21 of the DIN rail 2 is received in the first recess 331. Due to the restoring force of the first resilient element 35, the first slab member 33 is moved toward the base 311 in the arrow direction shown in FIG. 2(*d*). As a consequence, the first extending edge 21 and the second extending edge 22 of the DIN rail 2 are tightly clamped by the fastening mechanism 3. In other words, the detachable electronic device 1 is mounted on the DIN rail 2 via the fastening mechanism 3.

In this embodiment, the first slab member 33 is movable with respect to the frame 31 in response to stretch or compression of the first resilient element 35. As a consequence, the fastening mechanism 3 may be applied to many DIN rails with different widths. In a case that a relatively wider DIN rail is used, the pulling force exerting on the first slab member 33 should be increased. Whereas, in a case that a relatively narrower DIN rail is used, a smaller pulling force is feasible.

Figure 3A:
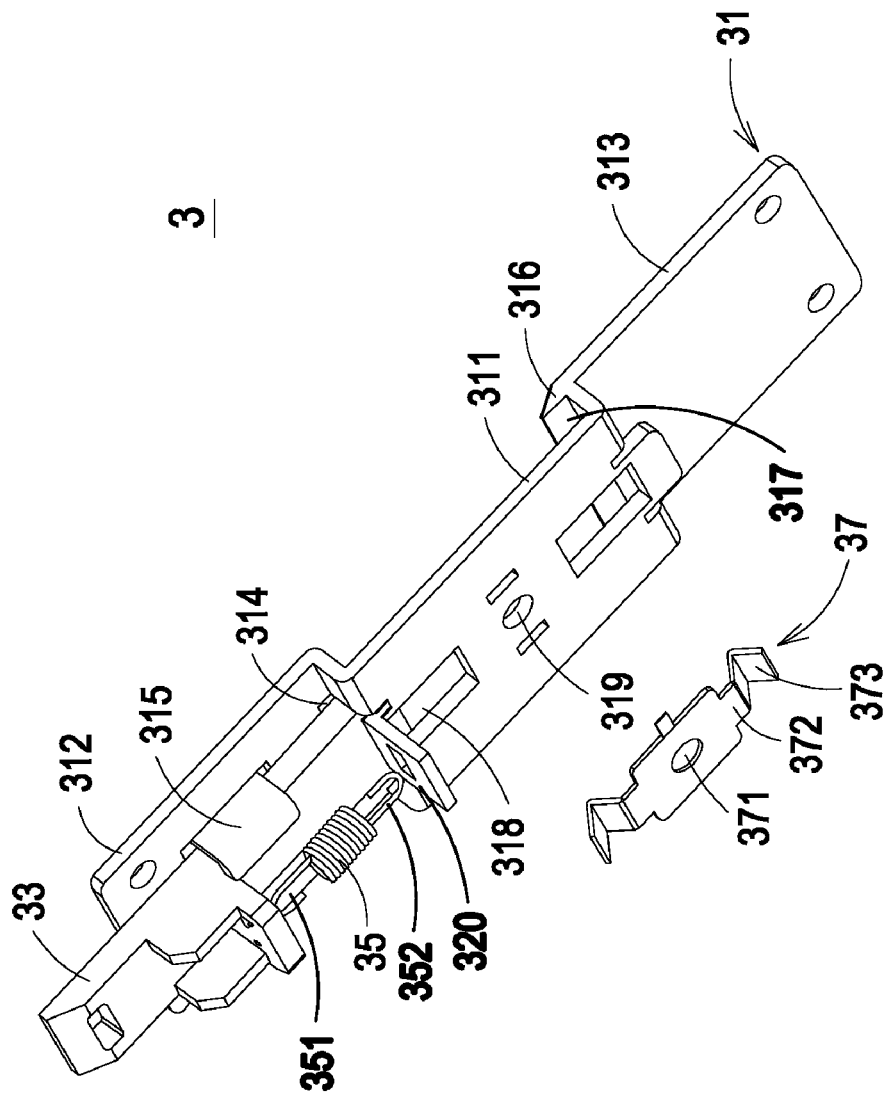
FIG. 3(a) is schematic perspective view illustrating a second variant of the fastening mechanism according to the first preferred embodiment.
Figure 3B:
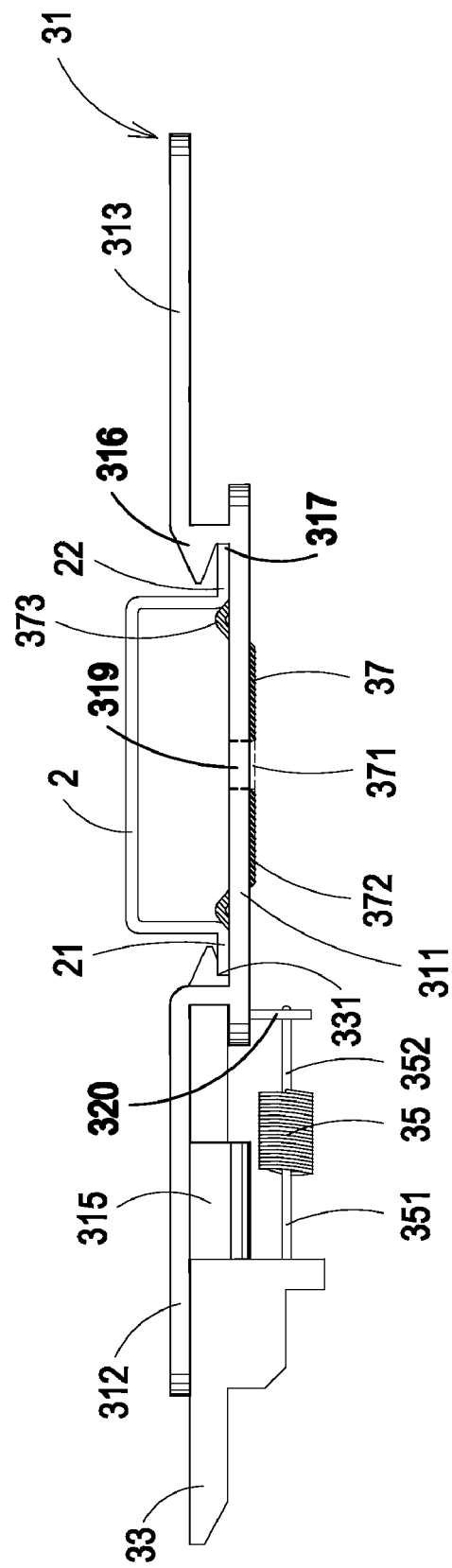
FIG. 3(b) is a schematic cross-sectional view illustrating the fastening mechanism of FIG. 3(a) coupled with the DIN rail.

Referring to FIG. 3(*a*), a second variant of a fastening mechanism is illustrated. The fastening mechanism 3 includes a frame 31, a first slab member 33, a first resilient element 35 and further a sustaining member 37. The sustaining member 37 is fixed on the bottom surface of the frame 31 and is formed by bending a metallic plate. The sustaining member 37 includes a pivotal hole 371 at the center-of-gravity position and two extension arms 372 at bilateral sides. The pivotal hole 371 is aligned with the pivotal hole 319 of the base 311. The extension arms 372 have respective bent ribs 373 received in the hollow portions 318 of the base 311.

FIG. 3(*b*) is a schematic cross-sectional view illustrating that the fastening mechanism 3 of FIG. 3(*a*) is coupled with the DIN rail 2. By penetrating a screwing element (not shown) through the pivotal hole 319 of the base 311 and the pivotal hole 371 of the sustaining member 37, the sustaining member 37 is fastened onto the frame 31. As a consequence, the sustaining member 37 is attached on the bottom surface of the frame 31 and the bent ribs 373 are penetrated through the hollow portions 318 of the base 311.

Please refer to FIG. 3(*b*). For coupling the fastening mechanism 3 to the DIN rail 2, the second extending edge 22 of the DIN rail 2 is firstly received in the second recess 317 between the protrusion structure 316 and the base 311. Then, in response to a pulling force exerting on the first slab member 33 in the direction away from the base 311, the first resilient element 35 is stretched and the first slab member 33 is movable with respect to the base 311 of the frame 31. After the first extending edge 21 of the DIN rail 2 is placed on the base 311, the end of the first slab member 33 is penetrated through the first perforation 314 and the first extending edge 21 of the DIN rail 2 is received in the first recess 331. Due to the restoring force of the first resilient element 35, the first slab member 33 is moved toward the base 311. As a consequence, the first extending edge 21 and the second extending edge 22 of the DIN rail 2 are tightly clamped by the fastening mechanism 3. In this embodiment, the bent ribs 373 are penetrated through the hollow portions 318 of the base 311 and sustained against the inner surface of the DIN rail 2 corresponding to the first extending edge 21 and the second extending edge 22 of the DIN rail 2. In other words, the sustaining member 37 may facilitate fixing the DIN rail 2.

Figure 4:
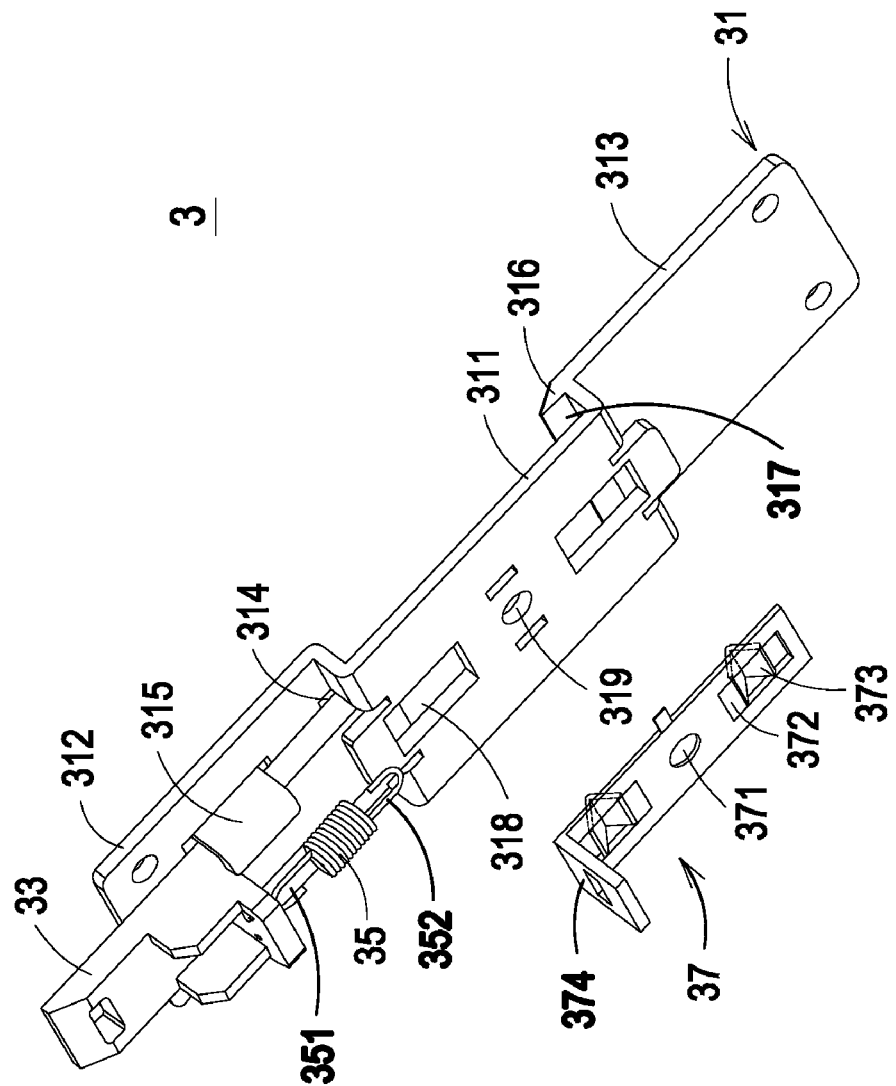
FIG. 4 is schematic perspective view illustrating a third variant of the fastening mechanism according to the first preferred embodiment.

A third variant of a fastening mechanism is illustrated in FIG. 4. In this embodiment, the frame 31, the first slab member 33 and the first resilient element 35 included therein are similar to those shown in FIG. 3, and are not redundantly described herein. In addition, the sustaining member 37 further includes a connecting part 374. The first terminal 351 of the first resilient element 35 is coupled to the first slab member 33. The second terminal 352 of the first resilient element 35 is coupled to the connecting part 374. Due to the restoring force of the first resilient element 35, the first extending edge 21 and the second extending edge 22 of the DIN rail 2 are tightly clamped by the fastening mechanism 3.

Figure 5A:
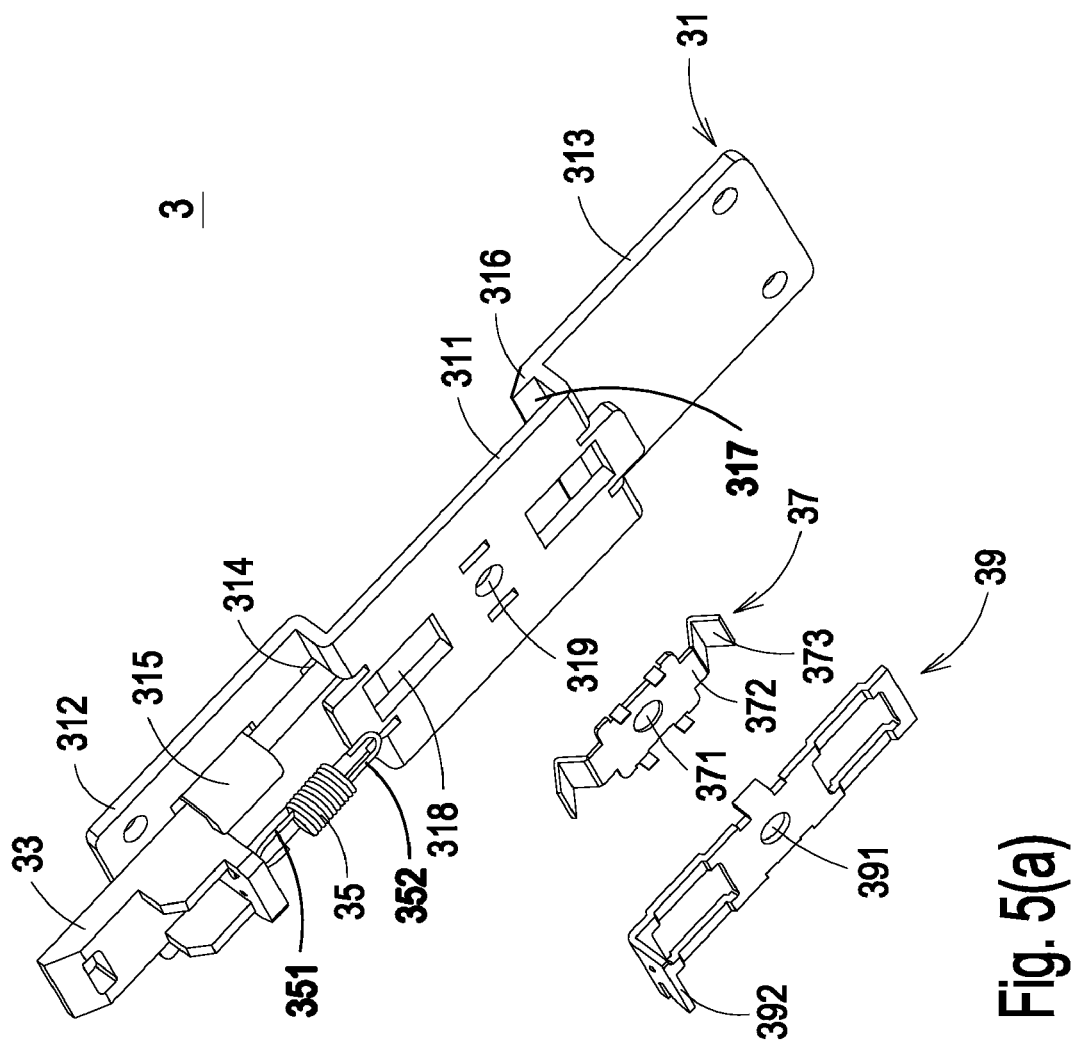
FIG. 5(a) is schematic perspective view illustrating a fourth variant of the fastening mechanism according to the first preferred embodiment.

Referring to FIG. 5(a), a fourth variant of a fastening mechanism is illustrated. In this embodiment, the frame 31, the first slab member 33, the first resilient element 35 and the sustaining member 37 included therein are similar to those shown in FIG. 3, and are not redundantly described herein. The fastening mechanism 3 of this embodiment further includes a sheltering plate 39 between the sustaining member 37 and the main body 10. It is preferred that the sheltering plate 39 and the sustaining member 37 are attached onto the frame 31. The sheltering plate 39 includes a pivotal hole 391 at the center-of-gravity position and aligned with the pivotal hole 319 of the base 311 and the pivotal hole 371 of the sustaining member 37. In addition, the sheltering plate 39 further includes a connecting part 392 extended from an edge thereof. The first terminal 351 of the first resilient element 35 is coupled to the first slab member 33. The second terminal 352 of the first resilient element 35 is coupled to the connecting part 392.

Figure 5B:
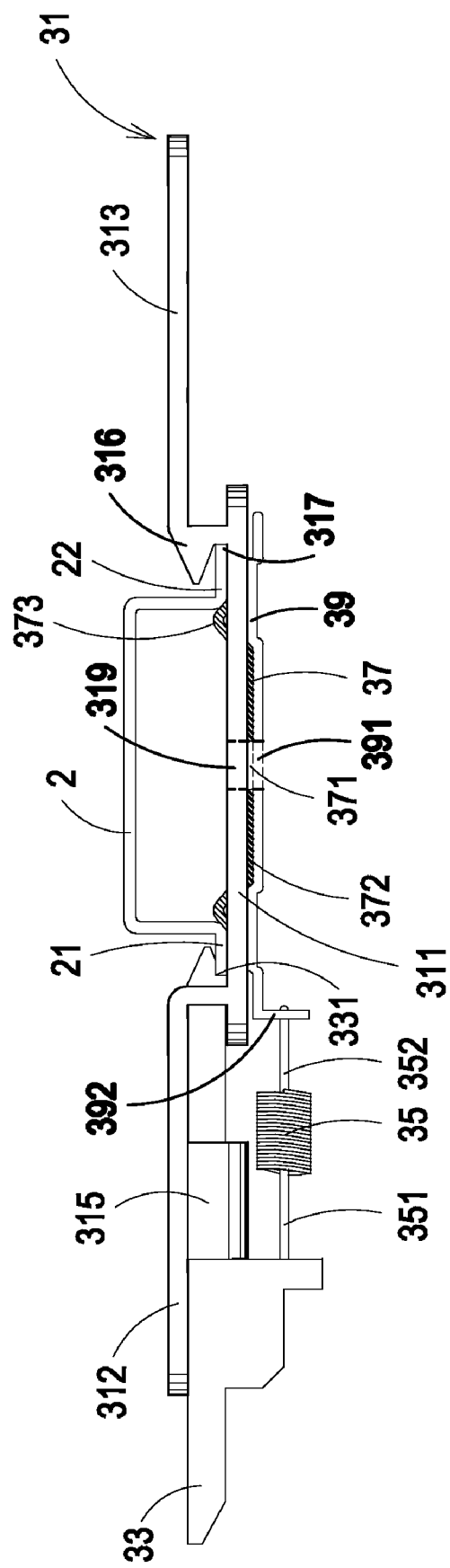
FIG. 5(b) is a schematic cross-sectional view illustrating the fastening mechanism of FIG. 5(a) coupled with the DIN rail.

FIG. 5(b) is a schematic cross-sectional view illustrating that the fastening mechanism 3 of FIG. 5(a) is coupled with the DIN rail 2. By penetrating a screwing element (not shown) through the pivotal hole 319 of the base 311, the pivotal hole 371 of the sustaining member 37 and the pivotal hole 391 of the sheltering plate 39, the sustaining member 37 and the sheltering plate 39 are fastened onto the frame 31. As a consequence, the sustaining member 37 and the sheltering plate 39 are attached on the bottom surface of the frame 31. The principles of coupling the fastening mechanism 3 to the DIN rail 2 are similar to those shown in FIG. 3(b), and are not redundantly described herein.

Figure 6:
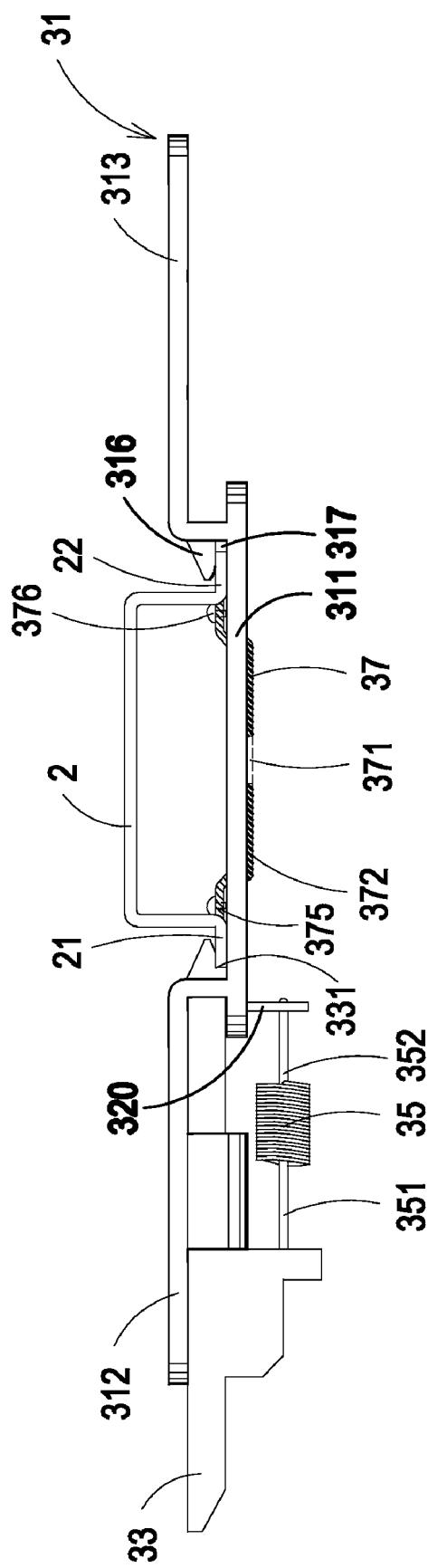
FIG. 6 is schematic cross-sectional view illustrating a fifth variant of the fastening mechanism according to the first preferred embodiment.

FIG. 6 schematically illustrates a fifth variant of a fastening mechanism. In this embodiment, the frame 31, the first slab member 33 and the first resilient element 35 included therein are similar to those shown in FIG. 3, and are not redundantly described herein. In addition, the bent ribs 373 of the sustaining member 37 are replaced by soft plug elements 376. The extension arms 372 are penetrated through the hollow portions 318 (as shown in FIG. 3) of the base 311 and then bent to be substantially parallel with the base 311. The ends of the extension arm 372 have respective apertures 375. The soft plug elements 376 are embedded in the apertures 375 so as to be sustained against the first extending edge 21 of the DIN rail 2. Preferably, the soft plug elements 376 are made of high frictional material such as rubber. Due to the restoring force of the first resilient element 35, the first extending edge 21 and the second extending edge 22 of the DIN rail 2 are tightly clamped by the fastening mechanism 3. Since the soft plug elements 376 are sustained against the inner surface of the DIN rail 2 corresponding to the first extending edge 21 and the second extending edge 22 of the DIN rail 2, the soft plug elements 376 of the sustaining member 37 may facilitate fixing the DIN rail 2.

Referring to FIG. 7(a), a schematic detachable electronic device to be mounted to a DIN rail according to a second preferred embodiment of the present invention is illustrated. The detachable electronic device 1 includes a main body 10 and a fastening mechanism 5. The fastening mechanism 5 is fixed on the main body 10 via at least a screwing element 6. By engagement between the fastening mechanism 5 and the extending edges 21, 22 of the DIN rail 2, the main body 10 of the detachable electronic device 1 is mounted to the DIN rail 2.

Hereinafter, a first variant of the fastening mechanism 5 will be illustrated in more details with reference to FIGS. 7(b) and 7(c). The fastening mechanism 5 includes a frame 51, a first slab member 53, a second slab member 54, a first resilient element 55 and a second resilient element 56. By partially cutting a metallic plate and bending the edge portions thereof, the frame 51 is integrally formed. In an embodiment, the frame 51 includes a base 511, a first extension part 512 and a second extension part 513. The first extension part 512 and the second extension part 513 are arranged at bilateral sides of the base 511 and higher than the base 511. A first perforation 514 is disposed between the first extension part 512 and the base 511. A second perforation 515 is disposed between the second extension part 513 and the base 511. The first extension part 512 further includes a first bracket 516 protruded from the bottom surface thereof. The second extension part 513 further includes a second bracket 517 protruded from the bottom surface thereof. The first slab member 53 is supported by the first bracket 516 and has an end penetrating through the first perforation 514 to be disposed over the base 511. The second slab member 54 is supported by the second bracket 517 and has an end penetrating through the second perforation 515 to be disposed over the base 511. The base 511 further includes at least two hollow portions 518 and at least a pivotal hole 519. The pivotal hole 519 is arranged at the center-of-gravity position of the base 511.

Figure 7B:
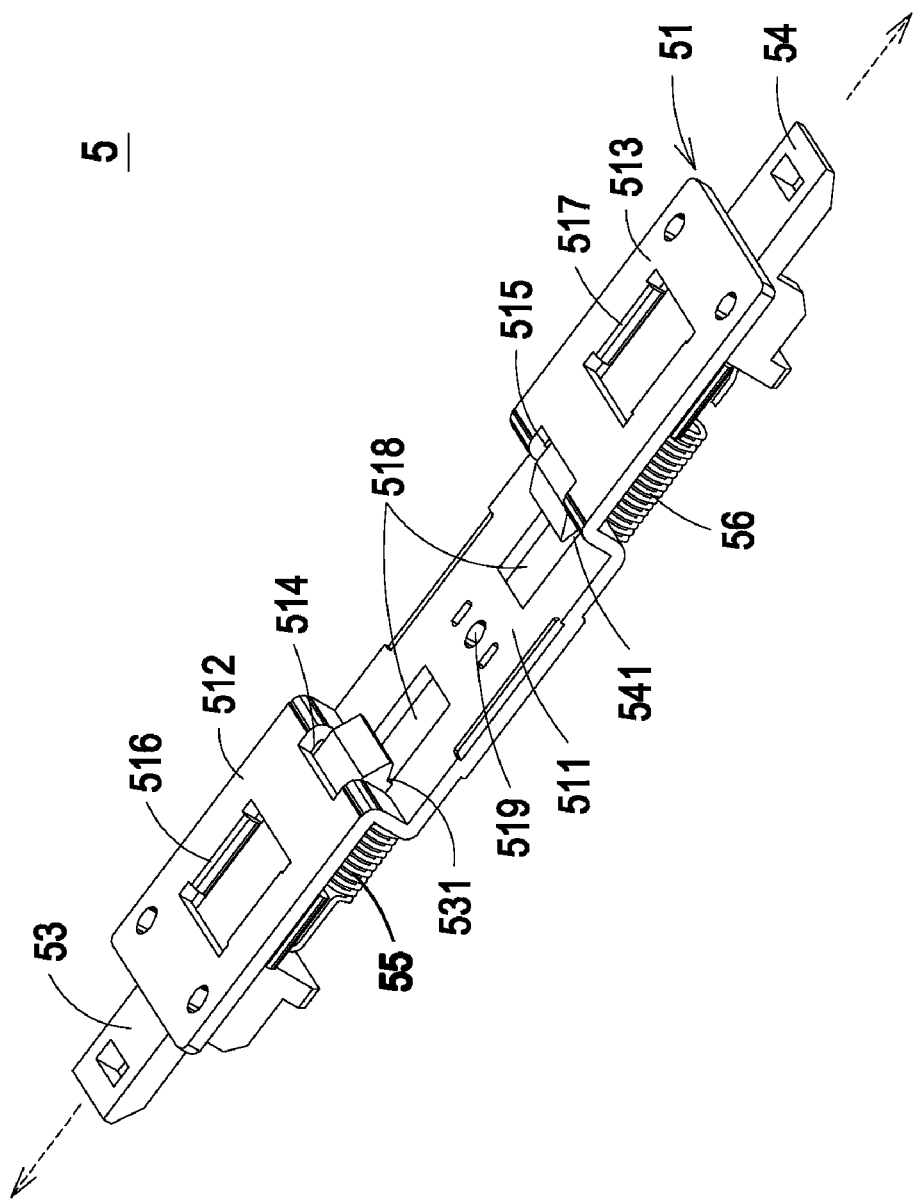
FIGS. 7(b) and 7(c) are schematic perspective view illustrating a first variant of the fastening mechanism according to the second preferred embodiment.
Figure 7C:
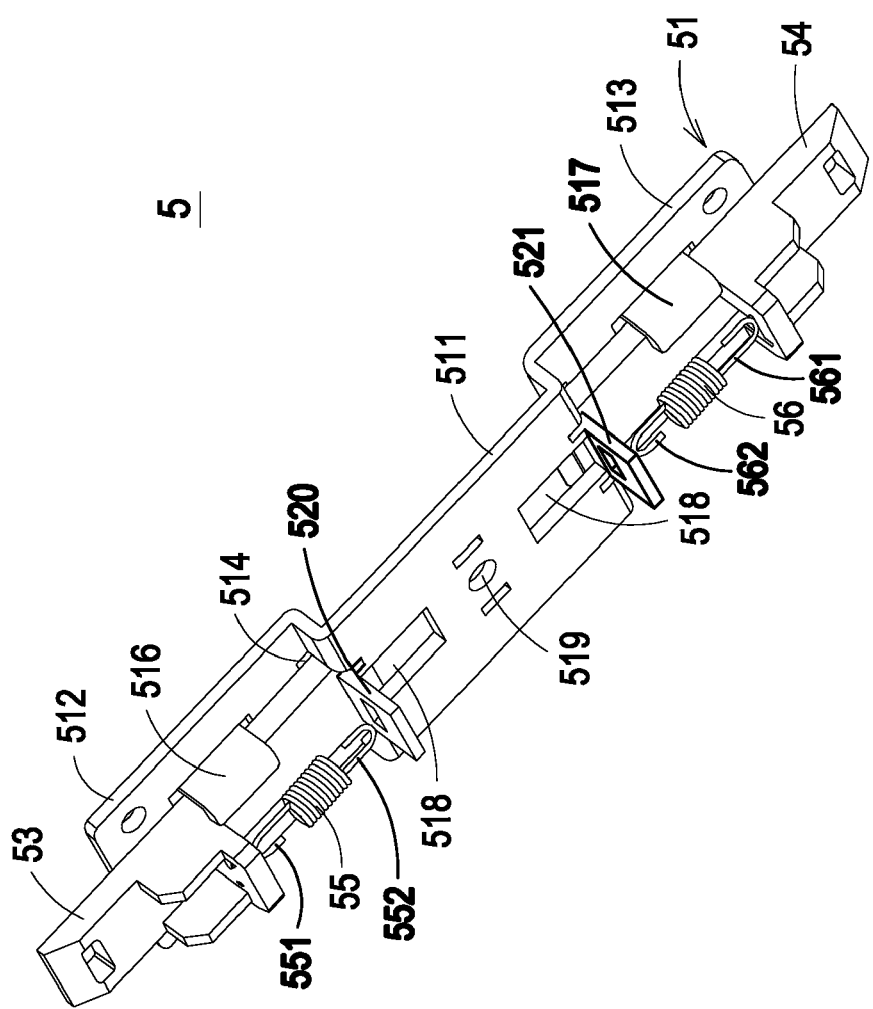

Please refer to FIGS. 7(b) and 7(c). The first slab member 53 and the second slab member 54 are made of polymeric material such as Nylon. The first slab member 53 further comprises a first recess 531 at the end penetrating through the first perforation 514 for receiving the first extending edge 21 of the DIN rail 2. The second slab member 54 further comprises a second recess 541 at the end penetrating through the second perforation 515 for receiving the second extending edge 22 of the DIN rail 2. The first resilient element 55 is for example a spring having a first terminal 551 coupled to the first slab member 53 and a second terminal 552 coupled to either a first ear part 520 of the frame 51 or another ear part (not shown) protruded from the main body 10. The second resilient element 56 is for example a spring having a first terminal 561 coupled to the second slab member 54 and a second terminal 562 coupled to either a second ear part 521 of the frame 51 or another ear part (not shown) protruded from the main body 10. In response to stretch or compression of the first resilient element 55 and the second resilient element 56, the first slab member 53 and the second slab member 54 are movable with respect to the frame 51.

Figure 7D:
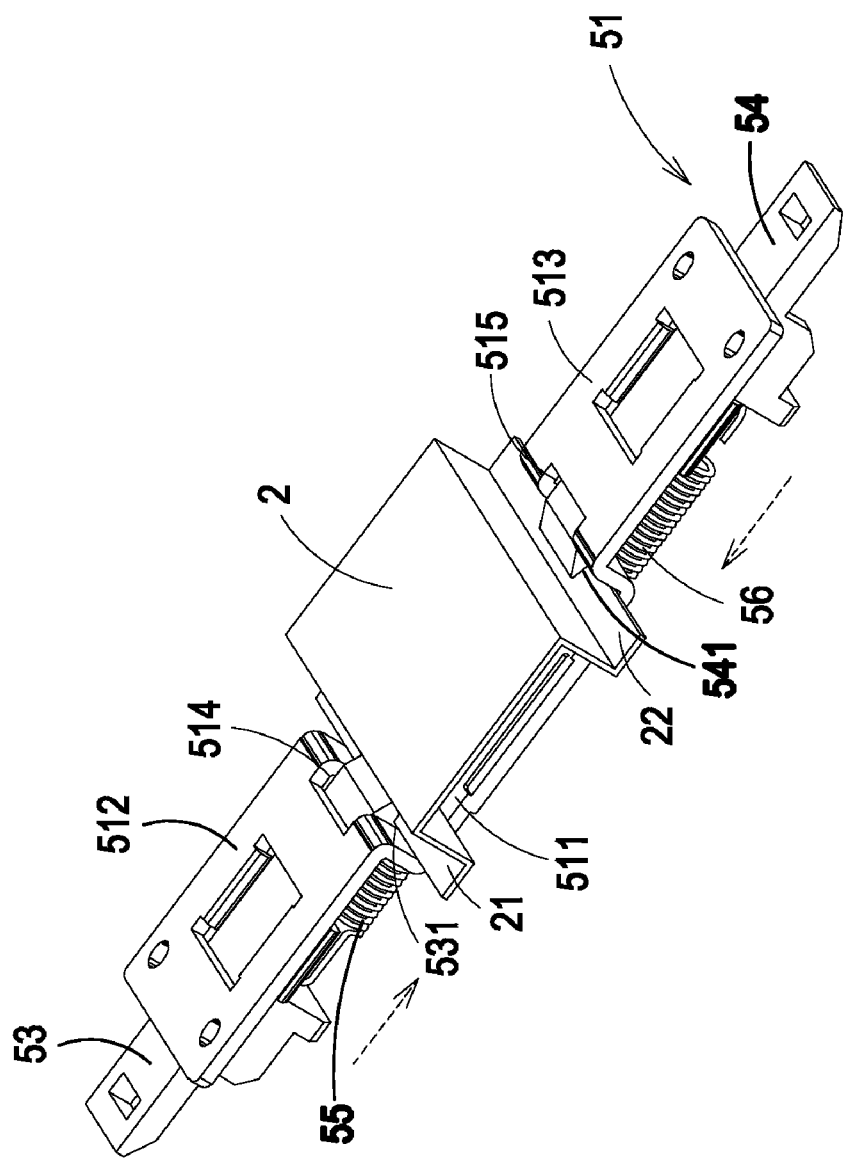
FIG. 7(d) is a schematic perspective view illustrating the fastening mechanism of FIG. 7(a) coupled with the DIN rail.

FIG. 7(d) is a schematic perspective view illustrating that the fastening mechanism 5 is coupled with the DIN rail 2. Please refer to FIGS. 7(b), 7(c) and 7(d). First of all, in response to a pulling force exerting on the first slab member 53 and the second slab member 54, the first resilient element 55 and the second resilient element 56 are stretched such that the first slab member 53 and the second slab member 54 are movable with respect to the frame 51. Meanwhile, the first slab member 53 and the second slab member 54 are sunken under the first perforation 514 and the second perforation 515, respectively. After the DIN rail 2 is placed on the base 511, the pulling force is eliminated. Due to the restoring forces of the first resilient element 55 and the second resilient element 56, the first slab member 53 and the second slab member 54 are moved toward the base 511 in the arrow direction shown in FIG. 7(d). As a consequence, the first extending edge 21 and the second extending edge 22 of the DIN rail 2 are tightly clamped by the fastening mechanism 5. In other words, the detachable electronic device 1 is mounted on the DIN rail 2 via the fastening mechanism 5.

In this embodiment, the first slab member 53 and the second slab member 54 are movable with respect to the frame 51 in response to stretch or compression of the first resilient element 55 and the second resilient element 56. As a consequence, the fastening mechanism 5 may be applied to many DIN rails with different widths. In a case that a relatively wider DIN rail is used, the pulling force exerting on the first slab member 53 and the second slab member 54 should be increased. Whereas, in a case that a relatively narrower DIN rail is used, a smaller pulling force is feasible.

Figure 8A:
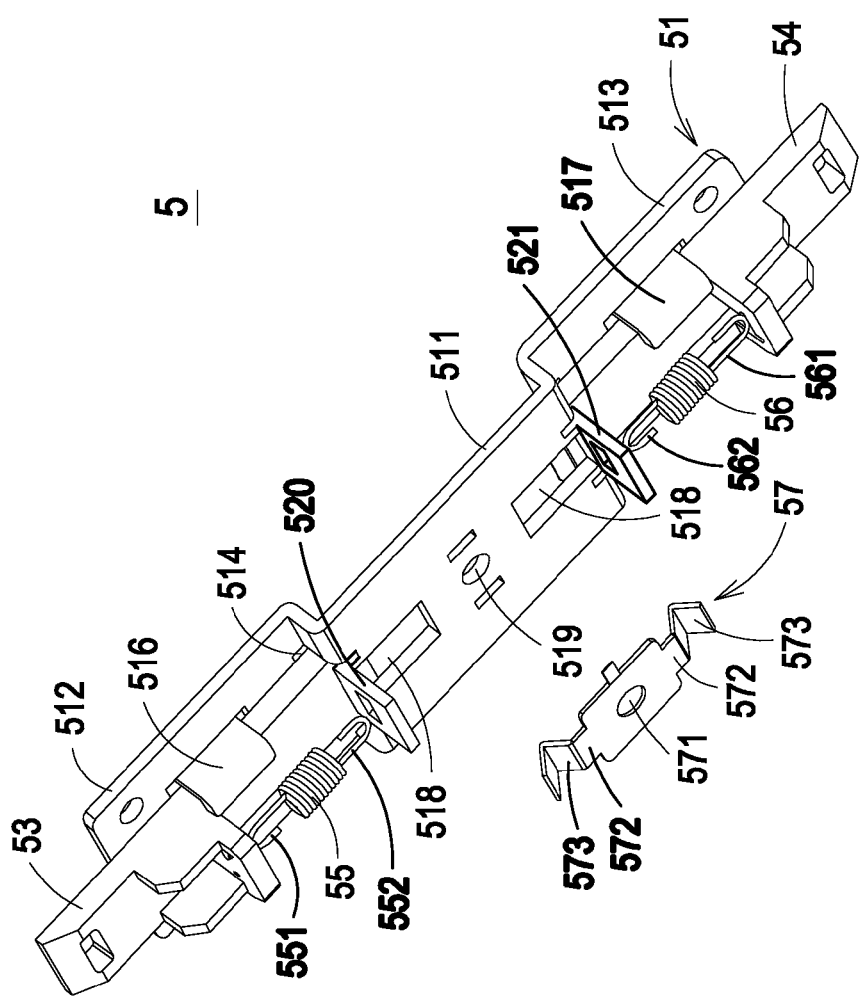
FIG. 8(*a*) is schematic perspective view illustrating a second variant of the fastening mechanism according to the second preferred embodiment.

Referring to FIG. 8(a), a second variant of a fastening mechanism is illustrated. The fastening mechanism 5 includes a frame 51, a first slab member 53, a second slab member 54, a first resilient element 55, a second resilient element 56 and further a sustaining member 57. The sustaining member 57 is fixed on the bottom surface of the frame 51 and is formed by bending a metallic plate. The sustaining member 57 includes a pivotal hole 571 at the center-of-gravity position and two extension arms 572 at bilateral sides. The pivotal hole 571 is aligned with the pivotal hole 519 of the base 511. The extension arms 572 have respective bent ribs 573 received in the hollow portions 518 of the base 511.

Figure 8B:
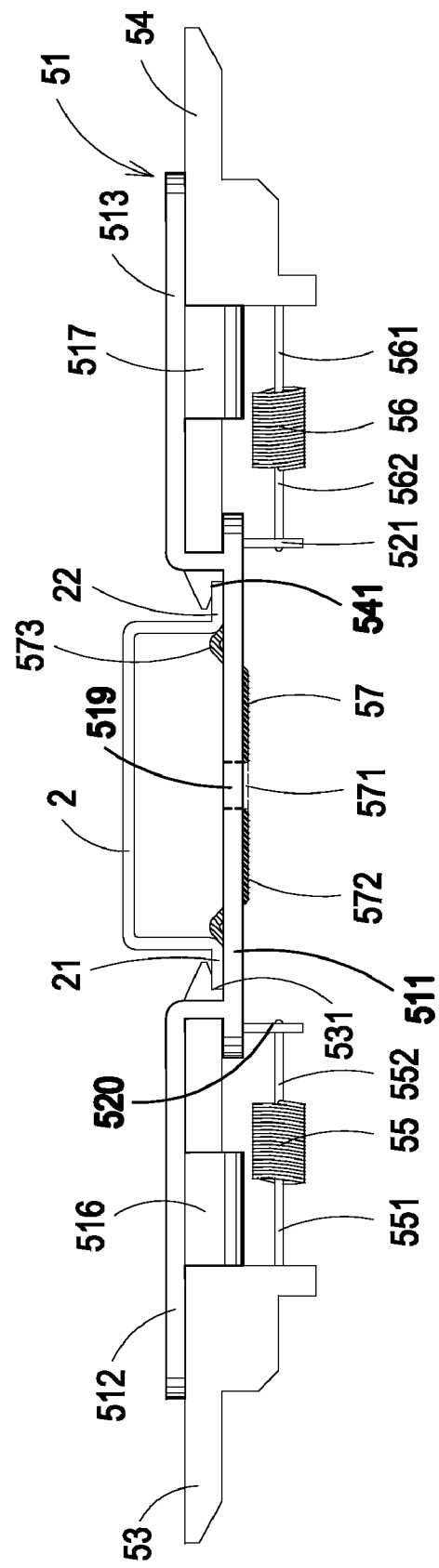

FIG. 8(b) is a schematic cross-sectional view illustrating that the fastening mechanism 5 of FIG. 8(a) is coupled with the DIN rail 2. By penetrating a screwing element (not shown) through the pivotal hole 519 of the base 511 and the pivotal hole 571 of the sustaining member 57, the sustaining member 57 is fastened onto the frame 51. As a consequence, the sustaining member 57 is attached on the bottom surface of the frame 51 and the bent ribs 573 are penetrated through the hollow portions 518 of the base 511.

Please refer to FIG. 8(b) again. For coupling the fastening mechanism 5 to the DIN rail 2, in response to a pulling force exerting on the first slab member 53 and the second slab member 54, the first resilient element 55 and the second resilient element 56 are stretched such that the first slab member 53 and the second slab member 54 are movable with respect to the frame 51. After the DIN rail 2 is placed on the base 511, the pulling force is eliminated. Due to the restoring forces of the first resilient element 55 and the second resilient element 56, the first slab member 53 and the second slab member 54 are moved toward the base 511. As a consequence, the first extending edge 21 and the second extending edge 22 of the DIN rail 2 are tightly clamped by the fastening mechanism 5. In this embodiment, the bent ribs 573 are penetrated through the hollow portions 518 of the base 511 and sustained against the inner surface of the DIN rail 2 corresponding to the first extending edge 21 and the second extending edge 22 of the DIN rail 2. In other words, the sustaining member 57 may facilitate fixing the DIN rail 2.

Figure 9:
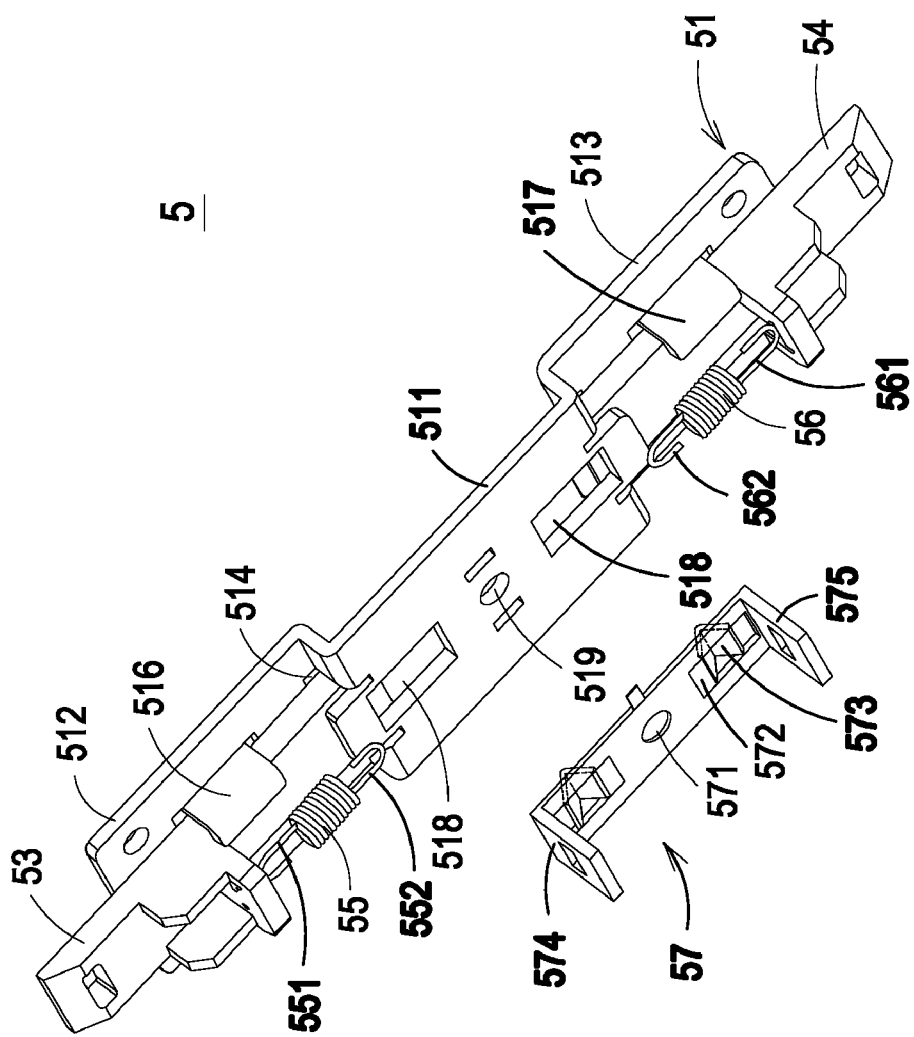
FIG. 9 is schematic perspective view illustrating a third variant of the fastening mechanism according to the second preferred embodiment.

A third variant of a fastening mechanism is illustrated in FIG. 9. In this embodiment, the frame 51, the first slab member 53, the second slab member 54, the first resilient element 55 and the second resilient element 56 included therein are similar to those shown in FIG. 8, and are not redundantly described herein. In addition, the sustaining member 57 further includes a first connecting part 574 and a second connecting part 575. The first terminal 551 and the second terminal 552 of the first resilient element 55 are coupled to the first slab member 53 and the first connecting part 574, respectively. The second terminal 561 and the second terminal 562 of the second resilient element 56 are coupled to the second slab member 54 and the second connecting part 575, respectively. Due to the restoring force of the first resilient element 55 and the second resilient element 56, the first extending edge 21 and the second extending edge 22 of the DIN rail 2 are tightly clamped by the fastening mechanism 5.

Figure 10A:
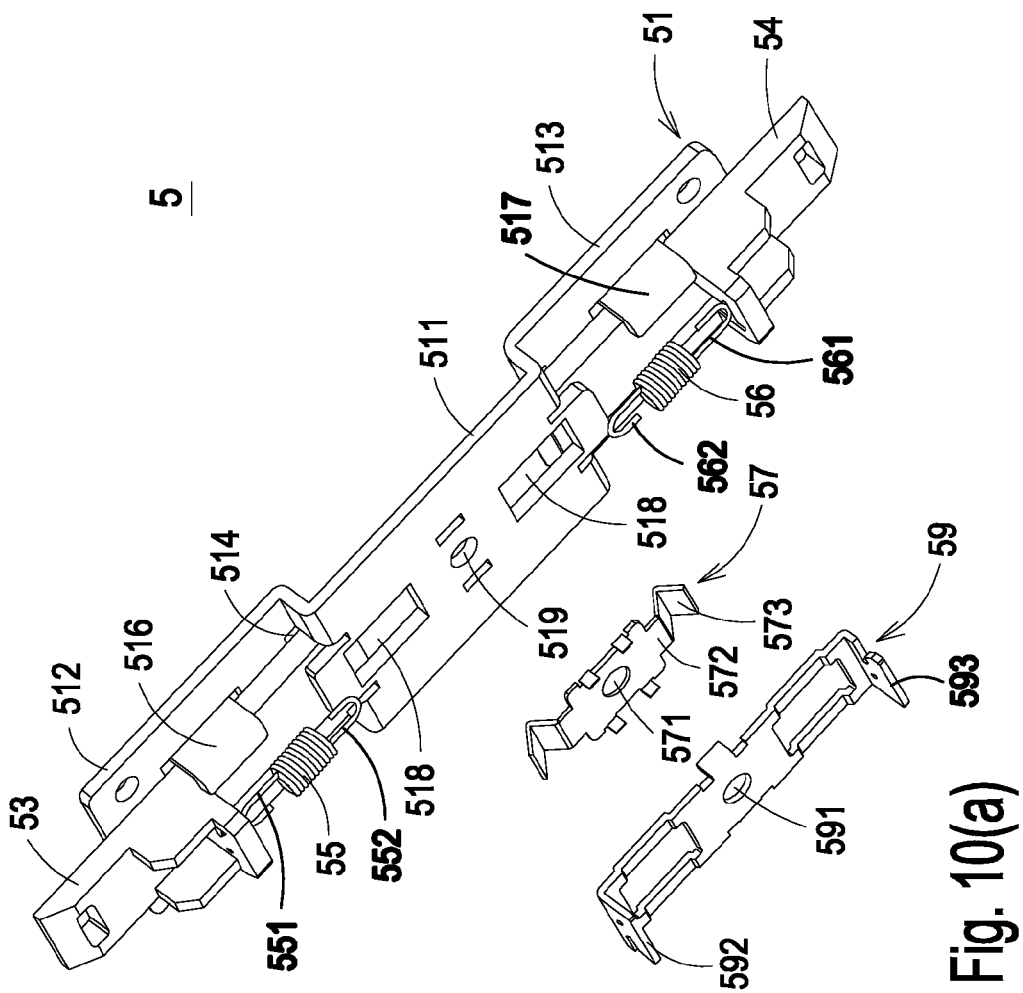
FIG. 10(*a*) is schematic perspective view illustrating a fourth variant of the fastening mechanism according to the second preferred embodiment.

Referring to FIG. 10(a), a fourth variant of a fastening mechanism is illustrated. In this embodiment, the frame 51, the first slab member 53, the second slab member 54, the first resilient element 55, the second resilient element 56 and the sustaining member 57 included therein are similar to those shown in FIG. 8, and are not redundantly described herein. The fastening mechanism 5 of this embodiment further includes a sheltering plate 59 between the sustaining member 57 and the main body 10. It is preferred that the sheltering plate 59 and the sustaining member 57 are attached onto the frame 51. The sheltering plate 59 includes a pivotal hole 591 at the center-of-gravity position and aligned with the pivotal hole 519 of the base 511 and the pivotal hole 571 of the sustaining member 57. In addition, the sheltering plate 39 further includes a first connecting part 592 and a second connecting part extended from both edges thereof. The first terminal 551 and the second terminal 552 of the first resilient element 55 are coupled to the first slab member 53 and the first connecting part 592, respectively. The second terminal 561 and the second terminal 562 of the second resilient element 56 are coupled to the second slab member 54 and the second connecting part 593, respectively.

Figure 10B:
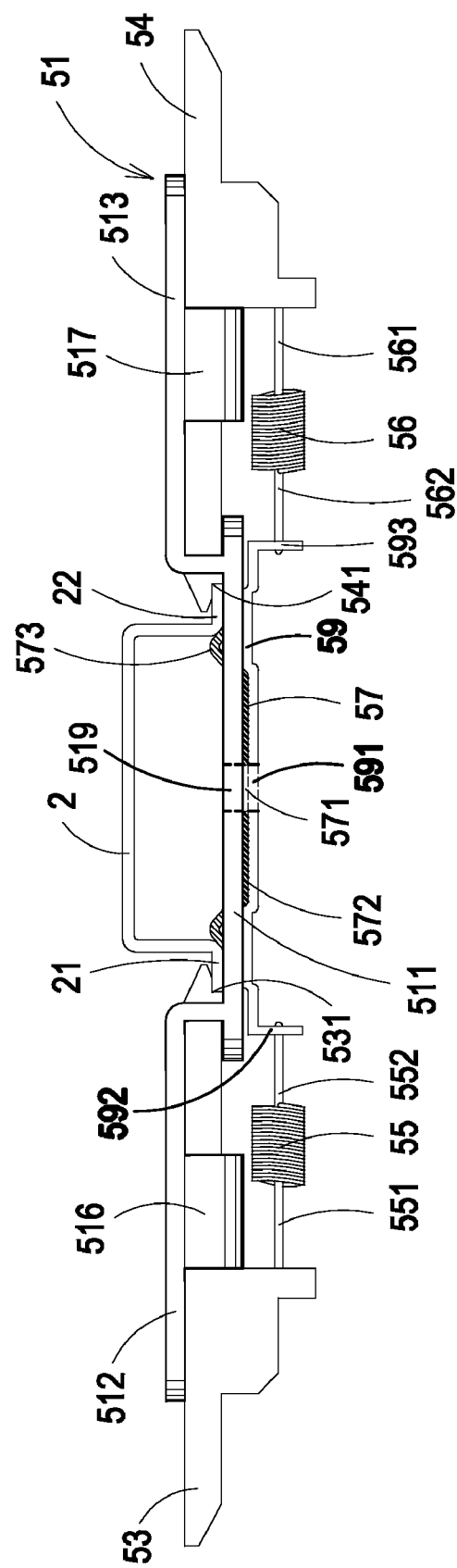

FIG. 10(b) is a schematic cross-sectional view illustrating that the fastening mechanism 5 of FIG. 10(a) is coupled with the DIN rail 2. By penetrating a screwing element (not shown) through the pivotal hole 519 of the base 511, the pivotal hole 571 of the sustaining member 57 and the pivotal hole 591 of the sheltering plate 59, the sustaining member 57 and the sheltering plate 59 are fastened onto the frame 51. As a consequence, the sustaining member 57 and the sheltering plate 59 are attached on the bottom surface of the frame 51. The principles of coupling the fastening mechanism 5 to the DIN rail 2 are similar to those shown in FIG. 8(b), and are not redundantly described herein.

Figure 11:
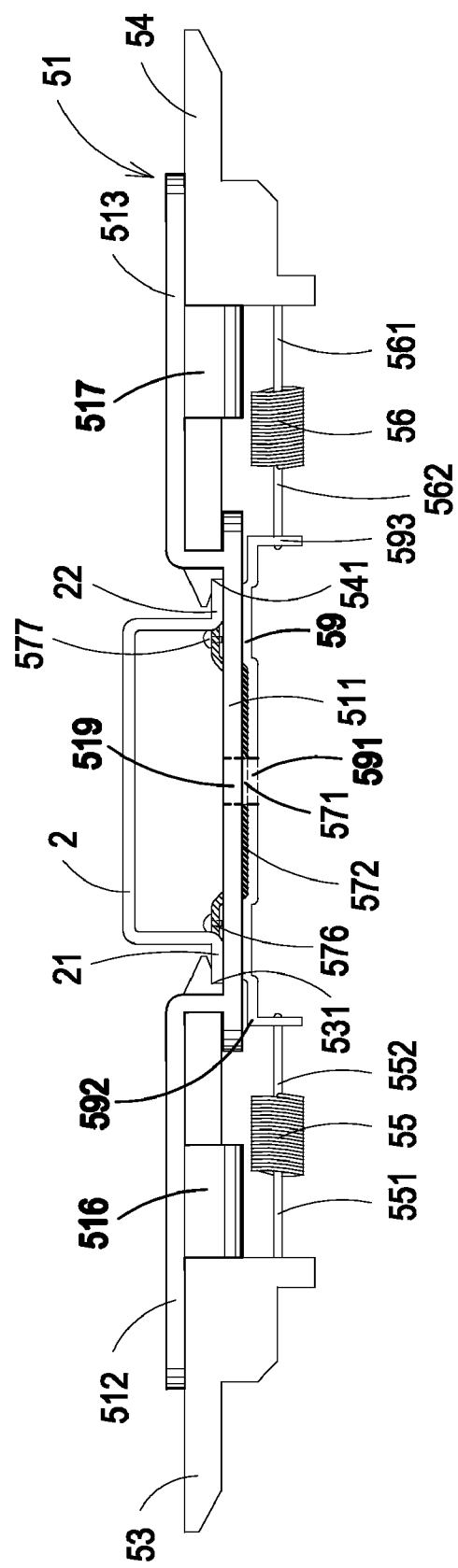
FIG. 11 is schematic cross-sectional view illustrating a fifth variant of the fastening mechanism according to the second preferred embodiment.

FIG. 11 schematically illustrates a fifth variant of a fastening mechanism. In this embodiment, the frame 51, the first slab member 53, the second slab member 54, the first resilient element 55 and the second resilient element 56 included therein are similar to those shown in FIG. 8, and are not redundantly described herein. In addition, the bent ribs 573 of the sustaining member 57 are replaced by soft plug elements 577. The extension arms 572 are penetrated through the hollow portions 518 of the base 511 and then bent to be substantially parallel with the base 511. The ends of the extension arm 572 have respective apertures 576. The soft plug elements 577 are embedded in the apertures 576 so as to be sustained against the first extending edge 21 and the second extending edge 22 of the DIN rail 2. Preferably, the soft plug elements 577 are made of high frictional material such as rubber. Due to the restoring force of the first resilient element 55 and the second resilient element 56, the first extending edge 21 and the second extending edge 22 of the DIN rail 2 are tightly clamped by the fastening mechanism 5. Since the soft plug elements 577 are sustained against the inner surface of the DIN rail 2 corresponding to the first extending edge 21 and the second extending edge 22 of the DIN rail 2, the soft plug elements 577 of the sustaining member 57 may facilitate fixing the DIN rail 2.

Figure 12:
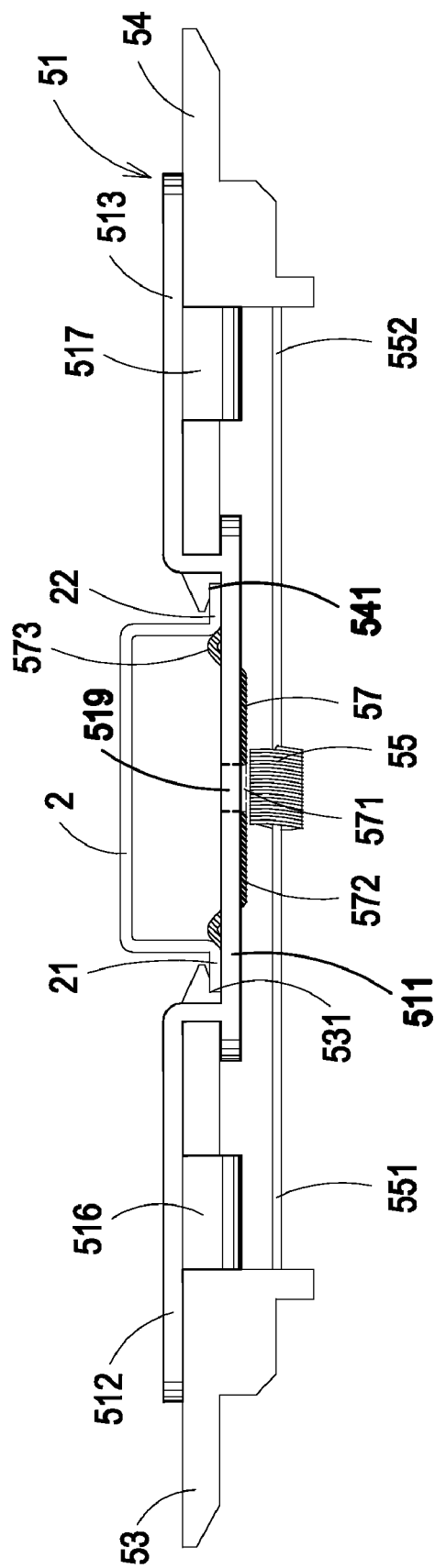
FIG. 12 is schematic cross-sectional view illustrating a sixth variant of the fastening mechanism according to the second preferred embodiment.

FIG. 12 schematically illustrates a sixth variant of a fastening mechanism. In this embodiment, the frame 51, the first slab member 53 and the second slab member 54 included therein are similar to those shown in FIG. 8, and are not redundantly described herein. The second resilient element 56 is dispensed with. Moreover, the first terminal 551 and the second terminal 552 of the first resilient element 55 are coupled to the first slab member 53 and the second slab member 54, respectively. The first slab member 53 and the second slab member 54 are supported by the first bracket 516 and the second bracket 517, respectively. Due to the restoring force of the first resilient element 55, the first extending edge 21 and the second extending edge 22 of the DIN rail 2 are tightly clamped by the fastening mechanism 5.

From the above description, due to the elasticity of the resilient element and the movable property of the slab member, the first extending edge and the second extending edge of the DIN rail are tightly clamped by the fastening mechanism of the present invention. Moreover, since the bent ribs of the sustaining member are sustained against the first extending edge and the second extending edge of the DIN rail, the claming force for clamping the DIN rail is enhanced. Similarly, the soft plug elements of the sustaining member are effective to increase friction force to further facilitate fixing the DIN rail. With the assistance of the sustaining member of the fastening mechanism, the detachable electronic device may be horizontally or vertically mounted onto the DIN rail. In a case of abrupt impact, the DIN rail is tightly clamped by the fastening mechanism of the present invention.

As previously described in the prior art, in response an external force, the DIN rail is readily suffered from deformation and DIN rail possibly has a breakdown. In contrast, since the slab member is movable with respect to the frame, the fastening mechanism of the present invention is applicable to many DIN rail having different widths. In addition, since the slab member is movable with respect to the frame, the depth of the recess of the slab member is adjustable to comply with the thickness of corresponding extending edge of the DIN rail. With the assistance of the bent ribs or the soft plug elements of the sustaining member, the detachable electronic device may be securely mounted onto the DIN rail.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fastening mechanism for fastening a detachable electronic device onto a DIN rail, said detachable electronic device having a main body, said DIN rail having a first extending edge and a second extending edge, said fastening mechanism comprising:
   a frame including a base, a first extension part and a second extension part, wherein said first extension part and said second extension part are arranged at bilateral sides of said base, said first extension part and said second extension part are disposed at a first level and said base is disposed at a second level lower than said first level, and a first perforation is formed between said first extension part and said base;
   a first slab member movable along the bottom surface of said first extension part and between said first level and said second level, and having an end penetrating through said first perforation to be disposed over said base; and
   a first resilient element coupled to said first slab member and exerting a clamping force for clamping said first extending edge of said DIN rail between said first slab member and said base.

2. The fastening mechanism according to claim 1 wherein said first resilient element has a first terminal coupled to said first slab member and a second terminal coupled to a first ear part of said frame.

3. The fastening mechanism according to claim 1 wherein said first resilient element has a first terminal coupled to said first slab member and a second terminal coupled to a first ear part protruded from said main body.

4. The fastening mechanism according to claim 1 further comprising:
   a first recess disposed in said first slab member for clamping said first extending edge of said DIN rail therein;
   a protrusion structure adjacent to said second extension part of said frame and said base;
   a second recess disposed between said protrusion structure and said base for receiving said second extending edge of said DIN rail therein;
   a first bracket protruded from the bottom surface of said first extension part for supporting said first slab member; and
   a sustaining member attached on the bottom surface of said base, wherein said sustaining member further includes at least an extension arm corresponding to a hollow portion of said base.

5. The fastening mechanism according to claim 4 wherein said extension arm of said sustaining member further includes a bent rib, which is penetrated through said hollow portion of said base and sustained against said first extending edge of said DIN rail.

6. The fastening mechanism according to claim 4 wherein said extension arm of said sustaining member further includes an aperture, wherein a soft plug element is embedded in the aperture to be sustained against said first extending edge of said DIN rail.

7. The fastening mechanism according to claim 6 wherein said soft plug element is made of rubbery material.

8. The fastening mechanism according to claim 4 wherein said sustaining member further includes at least a connecting part, and said first resilient element has a first terminal coupled to said first slab member and a second terminal coupled to said connecting part.

9. The fastening mechanism according to claim 4 wherein said fastening mechanism further includes a sheltering plate for facilitating attaching said sustaining member between said sheltering plate and said base of said frame.

10. The fastening mechanism according to claim 9 wherein said sheltering plate further includes at least a connecting part, and said first resilient element has a first terminal coupled to said first slab member and a second terminal coupled to said connecting part.

11. The fastening mechanism according to claim 1 further comprising:
a second perforation disposed between said second extension part and said base;
a second slab member movable along the bottom surface of said second extension part and having an end penetrating through said second perforation to be disposed over said base; and
a second resilient element coupled to said second slab member and exerting a clamping force for clamping said second extending edge of said DIN rail between said second slab member and said base.

12. The fastening mechanism according to claim 11 wherein said first resilient element has a first terminal coupled to said first slab member and a second terminal coupled to a first ear part of said frame, and said second resilient element has a first terminal coupled to said second slab member and a second terminal coupled to a second ear part of said frame.

13. The fastening mechanism according to claim 11 wherein said first resilient element has a first terminal coupled to said first slab member and a second terminal coupled to a first ear part protruded from said main body, and said second resilient element has a first terminal coupled to said second slab member and a second terminal coupled to a second ear part protruded from said main body.

14. The fastening mechanism according to claim 11 further comprising:
a first recess disposed in said first slab member for clamping said first extending edge of said DIN rail therein;
a second recess disposed in said second slab member for clamping said first extending edge of said DIN rail therein; and
a sustaining member attached on the bottom surface of said base, wherein said sustaining member further includes at least an extension arm corresponding to a hollow portion of said base.

15. The fastening mechanism according to claim 14 wherein said extension arm of said sustaining member further includes a bent rib, which is penetrated through said hollow portion of said base for sustaining against one of said first and second extending edges of said DIN rail.

16. The fastening mechanism according to claim 14 wherein said extension arm of said sustaining member further includes an aperture, wherein a soft plug element is embedded in the aperture to be sustained against said first or second extending edges of said DIN rail.

17. The fastening mechanism according to claim 14 wherein said sustaining member further comprises a first and a second connecting part, said first resilient element has a first terminal coupled to said first slab member and a second terminal coupled to said first connecting part, and said second resilient element has a first terminal coupled to said second slab member and a second terminal coupled to said second connecting part.

18. The fastening mechanism according to claim 14 wherein said fastening mechanism further comprises a sheltering plate for facilitating attaching said sustaining member between said sheltering plate and said base of said frame, said sheltering plate includes a first and a second connecting part, said first resilient element has a first terminal coupled to said first slab member and a second terminal coupled to said first connecting part, and said second resilient element has a first terminal coupled to said second slab member and a second terminal coupled to said second connecting part.

19. The fastening mechanism according to claim 11 further comprising:
a first bracket protruded from the bottom surface of said first extension part for supporting said first slab member; and
a second bracket protruded from the bottom surface of said second extension part for supporting said second slab member.

20. The fastening mechanism according to claim 1 further comprising:
a second perforation disposed between said second extension part and said base; and a second slab member movable along the bottom surface of said second extension part and having an end penetrating through said second perforation to be disposed over said base, wherein said first resilient element has a first terminal coupled to said second first member and a second terminal coupled to said second slab member to exert a clamping force for clamping said second extending edge of said DIN rail between said second slab member and said base.

* * * * *